United States Patent
Zhou et al.

(10) Patent No.: US 10,015,479 B2
(45) Date of Patent: Jul. 3, 2018

(54) 3D DISPLAY METHOD AND DEVICE FOR EXECUTING SAME

(71) Applicant: Samsung Electronics Co., Ltd., Suwon-si, Gyeonggi-do (KR)

(72) Inventors: Mingcai Zhou, Suwon-si (KR); Shandong Wang, Suwon-si (KR); Shaohui Jiao, Suwon-si (KR); Tao Hong, Suwon-si (KR); Weiming Li, Suwon-si (KR); Haitao Wang, Suwon-si (KR); Ji Yeun Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 243 days.

(21) Appl. No.: 14/916,877

(22) PCT Filed: Sep. 1, 2014

(86) PCT No.: PCT/KR2014/008124
§ 371 (c)(1),
(2) Date: May 27, 2016

(87) PCT Pub. No.: WO2015/034226
PCT Pub. Date: Mar. 12, 2015

(65) Prior Publication Data
US 2017/0171537 A1 Jun. 15, 2017

(30) Foreign Application Priority Data

Sep. 6, 2013 (CN) .......................... 2013 1 0403633
Nov. 19, 2013 (KR) ........................ 10-2013-0140760

(51) Int. Cl.
*H04N 13/00* (2018.01)
*H04N 13/04* (2006.01)

(52) U.S. Cl.
CPC ..... *H04N 13/0497* (2013.01); *H04N 13/0404* (2013.01); *H04N 13/0406* (2013.01)

(58) Field of Classification Search
None
See application file for complete search history.

(56) References Cited

U.S. PATENT DOCUMENTS

| | | | | |
|---|---|---|---|---|
| 2007/0109620 | A1* | 5/2007 | Saishu | G02B 27/2214 359/23 |
| 2008/0079805 | A1* | 4/2008 | Takagi | H04N 13/0018 348/51 |
| 2008/0225113 | A1* | 9/2008 | Saishu | H04N 13/0404 348/51 |
| 2009/0102916 | A1* | 4/2009 | Saishu | H04N 13/0048 348/54 |
| 2011/0069152 | A1 | 3/2011 | Wang et al. | |
| 2011/0292472 | A1 | 12/2011 | Hiberty et al. | |
| 2012/0212486 | A1 | 8/2012 | Van Der Horst et al. | |
| 2013/0128008 | A1 | 5/2013 | Javidi et al. | |
| 2014/0192171 | A1 | 7/2014 | Shin et al. | |

FOREIGN PATENT DOCUMENTS

| | | |
|---|---|---|
| JP | 2012-142800 A | 7/2012 |
| KR | 10-0782831 B1 | 12/2007 |
| KR | 10-2012-0095212 | 8/2012 |
| KR | 10-1173335 B1 | 8/2012 |
| KR | 10-2012-0127151 | 11/2012 |
| KR | 10-2013-0076050 | 7/2013 |
| KR | 10-2013-0077021 | 7/2013 |
| KR | 10-1294261 B1 | 8/2013 |

OTHER PUBLICATIONS

Ju-Seong Jang, et al., "Improved viewing resolution of three-dimensional integral imaging by use of nonstationary micro-optics", Optics Letters, vol. 27, No. 5, pp. 324-326, Dated Mar. 1, 2002.
Hongen Liao, et al., "Improved viewing resolution of integral videography by use of rotated prism sheets", Optics Express, vol. 15, No. 8, pp. 4814-4822, Dated Apr. 16, 2007.
Yunhee Kim, et al., "Point light source integral imaging with improved resolution and viewing angle by the use of electrically movable pinhole array", Optics Express, vol. 15, No. 26, pp. 18253-18267, dated Dec. 24, 2007.
Will Allen, et al., "47.4: Invited Paper: Wobulation: Doubling the Addressed Reslution of Projection Displays", SID 05 Digest, pp. 1514-1517, Dated 2005.
Piotr Didyk, et al., "Apparent Display Resolution Enhancement for Moving Images", dated 2010.
International Search Report PCT/ISA/210 for International Application No. PCT/KR2014/008124 dated Dec. 9, 2014.
Written Opinion of the International Searching Authority PCT/ISA/237 for International Application No. PCT/KR2014/008124 dated Dec. 9, 2014.

\* cited by examiner

*Primary Examiner* — Mishawn Hunter
(74) *Attorney, Agent, or Firm* — Harness, Dickey & Pierce, P.L.C.

(57) ABSTRACT

A three-dimensional (3D) display method includes generating N first visual images, N being a natural number greater than 1; generating M second visual images from each of the N first visual images, M being a natural number greater than 1; acquiring N visual image groups corresponding to the N first visual images, respectively, such that, for each one of the N visual image groups, the visual image group includes the M second visual images generated from the first visual image, from among the N first visual images, to which the visual image group corresponds; generating M elemental image array (EIA) images based on the N visual image groups; and time-share displaying the M EIA images.

18 Claims, 2 Drawing Sheets

100

3D DISPLAY METHOD AND DEVICE FOR EXECUTING SAME

CROSS-REFERENCE TO RELATED APPLICATIONS

This application is the U.S. National Phase application of PCT Application No. PCT/KR2014/008124 filed on Sep. 1, 2014, which claims priority to Chinese Patent Application No. 201310403633.2 filed on Sep. 6, 2013 and Korean Patent Application No. 10-2013-0140760 filed on Nov. 19, 2013, the contents of each of which are incorporated herein by reference.

TECHNICAL FIELD

Example embodiments relate to a three-dimensional (3D) display method and device for executing the same.

BACKGROUND ART

With the development of scientific technology, black and white display technology developed into color display technology and two-dimensional (2D) display technology developed into three-dimensional (3D) technology, thereby maximizing user experience. 3D display technology includes a 3D display based on a parallax, a hologram display, and volume rendering. The 3D display may be classified as a display method and an integral imaging display method using a parallax barrier. So that a user may directly view a 3D image having relatively high brightness, the integral imaging display method may be used to provide the user with the 3D image.

In general, an integral imaging display system includes a liquid crystal display (LCD) panel and a micro lens array (MLA). The integral imaging display system may be operated by displaying an elementary image array (EIA) image set as a 2D image in the LCD panel behind the MLA to allow the user to view a 3D image. The integral imaging display system may form the 3D image by refracting different portions of the EIA image in different directions in a 3D space, through the MLA. Performance of the integral imaging display system may be associated with a spatial resolution, an angular resolution, a viewing angle, and a 3D depth range to be displayed.

DISCLOSURE OF INVENTION

Technical Goals

Example embodiments provide technology for maintaining a resolution while enhancing a spatial resolution in a state in which a total resolution of an integral imaging display system is maintained, by generating a plurality of elemental image array (EIA) images each having an offset and time-share displaying the plurality of EIA images.

Technical Solutions

According to example embodiments, there is provided a three-dimensional (3D) display method including generating N first visual images, N being a natural number greater than 1, generating M second visual images from each of the N first visual images, M being a natural number greater than 1, acquiring N visual image groups including each of the M second visual images, generating M elemental image array (EIA) images based on the N visual image groups, and time-share displaying the M EIA images.

The generating of the second visual images may include generating the M second visual images each having a different offset in a preset direction from an identical visual image among the first visual images.

The M second visual images included in each of different visual image groups may have an identical offset.

The generating of the EIA images may include generating one EIA image by selecting N second visual images having an identical offset from the N visual image groups.

A range of the offset may be a range from 1/M pixels to (M−1)/M pixels.

The offset may be (k−1)/M pixels, k is a serial number of the M second visual images, and a range of k is [1,M].

The 3D display method may further include changing locations of the time-share displayed M EIA images by a predetermined distance according to a preset direction, and time-share displaying the M EIA images again at the changed locations.

A resolution according to a preset direction of the N first visual images may be M times a resolution according to a preset direction of the M second visual images.

The preset direction may be a horizontal direction, a vertical direction, or a predetermined direction.

The N first visual images may correspond to one visual angle.

According to example embodiments, there is provided a three-dimensional (3D) device of an integral imaging display system, the device including a first visual image generator configured to generate N first visual images corresponding to one visual angle, N being a natural number greater than 1, a second visual image generator configured to generate M second visual images from each of the N first visual images and acquire N visual image groups including each of the M second visual images, M being a natural number greater than 1, a mapper configured to generate M elemental image array (EIA) images based on the N visual image groups, and a display configured to time-share display the M EIA images.

The mapper may be configured to generate M second visual images each having a different offset in a preset direction from an identical visual image among the N first visual images.

The M second visual images included in each of different visual image groups may have an identical offset.

The mapper may be configured to generate one EIA image by selecting N second visual images having an identical offset from the N visual image groups.

The display may be configured to change locations of the time-share displayed M EIA images by a predetermined distance according to a preset direction, and time-share display the M EIA images again at the changed locations.

A resolution according to a preset direction of the N first visual images may be M times a resolution according to a preset direction of the M second visual images.

The preset direction may be a horizontal direction, a vertical direction, or a predetermined direction.

BEST MODE FOR CARRYING OUT THE INVENTION

The following detailed description is provided in order to explain the embodiments by referring to the figures.

Figure 1:
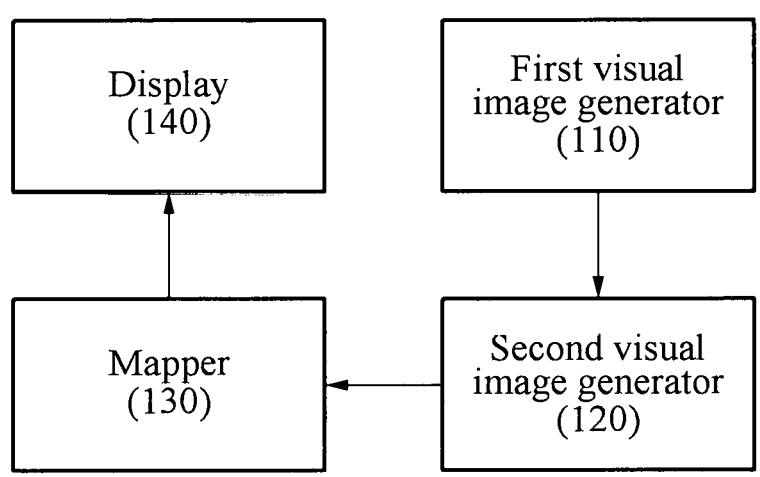
FIG. 1 is a block diagram illustrating a three-dimensional (3D) display device of an integral imaging display system according to example embodiments.

FIG. 1 is a block diagram illustrating a three-dimensional (3D) display device of an integral imaging display system according to example embodiments.

In an integral imaging display system, a resolution of a visual image may correspond to a resolution of a micro lens array (MLA). Referring to FIG. 1, the resolution of the MLA is assumed to be m×n for ease of description. For example, the resolution of the visual image may be m×n.

Referring to FIG. 1, a 3D display device 100 includes a first visual image generator 110, a second visual image generator 120, a mapper 130, and a display 140.

The first visual image generator 110 generates N first visual images. For example, N is a natural number greater than 1. For example, the N first visual images may correspond to one visual angle.

In an example, the first visual image generator 110 may enhance a spatial resolution according to a preset direction of the N first visual images. For example, to increase the spatial resolution by a preset multiple, for example, M times, the first visual image generator 110 may set a resolution of the N first visual images to be increased by a preset multiple such that the resolution of the N first visual images is greater than the resolution of the MLA. For example, the preset direction may be a horizontal direction, a vertical direction, or a predetermined direction.

For example, when the spatial resolution according to the horizontal direction is increased by M times, the resolution of the N first visual images to be generated from the first visual image generator 110 may be set to be m×(M×n).

The first visual image generator 110 may generate the N first visual images having the resolution increased by the preset multiple.

The second visual image generator 120 may acquire N visual image groups by generating M second visual images from each of the N first visual images. For example, M is a natural number greater than 1. M may be a natural number identical to or different from N. A resolution of the M second visual images may correspond to the resolution of the MLA. For example, the resolution of the M second visual images may be m×n. For example, the resolution of the N first visual images generated by the first visual image generator 110 may be greater than the resolution of the M second visual images.

The second visual image generator 120 may acquire one visual image group by generating the M second visual images using one, for example, a first visual image, of the N first visual images. For example, the second visual image generator 120 may acquire the N visual image groups by generating the M second visual images for each visual image included in the N first visual images.

In an example, the M second visual images generated from an identical image, for example, a first visual image, among the N first visual images may each have a different offset in a preset direction. For example, when the M second visual images overlap, the first visual image may be generated.

In another example, each offset method of the N visual image groups may be identical. For example, the M second visual images included in each of different visual image groups may have an identical offset. For example, when the M second visual images are numbered for each image group based on an identical offset method, the M second visual images having an identical number in the different visual image groups may have an identical offset.

In still another example, the second visual image generator 120 may generate the M second visual images including a reference image without an offset. Remaining M−1 second visual images may each have a different offset in the preset direction. For example, the M−1 second visual images may each have a different offset in the preset direction based on the reference image. In this example, a range of the offset may be a range from 1/M pixels to (M−1)/M pixels. For example, when the 1/M pixels are set to be a step size, the offset may be increased to (M−1)/M pixels from 1/M pixels. For example, the offset may be (k−1)/M. In this example, k may be a serial number of the M second visual images. A range of k may be [2,M]. For example, an offset of visual images of which serial numbers are close among the M−1 second visual images may be 1/M pixels.

The second visual image generator 120 may select any one visual image having a predetermined offset among the M second visual images and set the selected visual image as the reference image. For example, the reference image may be set to have an offset according to a preset direction of each of the M second visual images.

Hereinafter, a method of generating second visual images by the second visual image generator 120 will be described.

A relationship of any one visual image, for example, a first visual image, among the N first visual images between the M second visual images generated from the first visual image may be expressed as Equation 1.

$$AB = I_H \quad \text{[Equation 1]}$$

$I_H$ denotes one dimensional matrix formed using a pixel value of a predetermined line according to a preset direction of a first visual image. A denotes a matrix of (M×N)×(M×N) B denotes one dimensional matrix formed using a pixel value corresponding to the predetermined line of the M second visual images generated from the first visual image.

The matrix B may be expressed as Equation 2.

$$B = \begin{bmatrix} I_L^1 \\ \vdots \\ I_L^i \\ \vdots \\ I_L^M \end{bmatrix} \quad \text{[Equation 2]}$$

$I_L^1$ denotes a pixel value of a line according to a preset direction of a first second visual image among the M second visual images, and $I_L^i$ denotes a pixel value of a line according to the preset direction of an i-th second visual image among the M second visual images. $I_L^M$ denotes a pixel value of a line according to the preset direction of an M-th second visual image among the M second visual images. Each of $I_L^1$, $I_L^i$, $I_L^M$ may include a plurality of elements.

For example, when the preset direction is set to be a horizontal direction, a pixel value of a line according to the horizontal direction of the first visual image is M×n, and $I_H$ may include M×n elements. A pixel value of a line according to the horizontal direction of each of the M second visual images is n, and B may include M×n elements.

A value of an element A(i,j) included in a matrix A may be determined using Equation 3.

$$A(i,j)=1/M, \text{ if } d \geq M-a, c=b+1 \text{ or } d<M-a, c=b\ A(i,j)=0, \text{ otherwise} \quad \text{[Equation 3]}$$

Here, i is a natural number indicating a line and j is a natural number indicating a column, and i and j may satisfy Equation 4. a, b, c, and d may be expressed as Equation 5.

$$i \in [1, M \times N] \quad \text{[Equation 4]}$$

$$j \in [1, M \times N] \quad \text{[Equation 5]}$$

a=ii mod M
b=floor(i/M)
c=j mod N
d=floor(j/N)

Here, mod denotes a modulo operation, and floor( ) denotes a round down function.

Since the matrix A and $I_H$ are obtained first, a matrix B may be calculated using Equation 1. For example, the second visual image generator 120 may obtain pixel values of all lines according to the preset direction of the M second visual images generated from the first visual image using Equation 1, and acquire the M second visual images.

For example, when the preset direction is set to be the horizontal direction, the pixel value of the line according to the horizontal direction may be a pixel value of each horizontal line. When the preset direction is set to be the vertical direction, a pixel value of a line according to the vertical direction may be a pixel value of each vertical line, for example, a column. When the preset direction is set to be an angle, for example, an angle of 45 degrees, pixels included in an image may form a plurality of lines according to the angle, for example, the angle of 45 degrees.

In this example, when an image displayed in the integral imaging display system is rectangular and the preset direction is not the horizontal direction or the vertical direction, numbers of pixels of the lines according to the preset direction may be different. However, the second visual image generator 120 may use Equation 1 to calculate a pixel value of each line. When the image displayed in the integral imaging display is circular, the numbers of the pixels of the lines according to different directions may be identical.

The mapper 130 may generate M elemental image array (EIA) images based on the N visual image groups. For example, the mapper 130 may generate one EIA image by selecting the N second visual images having an identical offset from the N visual image groups. The mapper 130 may generate the M EIA images by selecting the N second visual images having the identical offset from the N visual image groups.

The display 140 may time-share display the M EIA images. For example, the display 140 may display the M EIA images in M time slots. For example, the M time slots may be consecutive.

In an example, the display 140 may change locations of the time-share displayed M EIA images by a predetermined distance according to the preset direction, and time-share display the M EIA images again at the changed locations. For example, the display 140 may repeatedly perform time-share displaying.

The 3D display device 100 may generate a plurality of EIA images having an offset and time-share display the plurality of EIA images, such that the integral imaging display system may maintain an angular resolution while enhancing the spatial resolution in a state in which a total resolution of an LCD panel is maintained.

Figure 2:
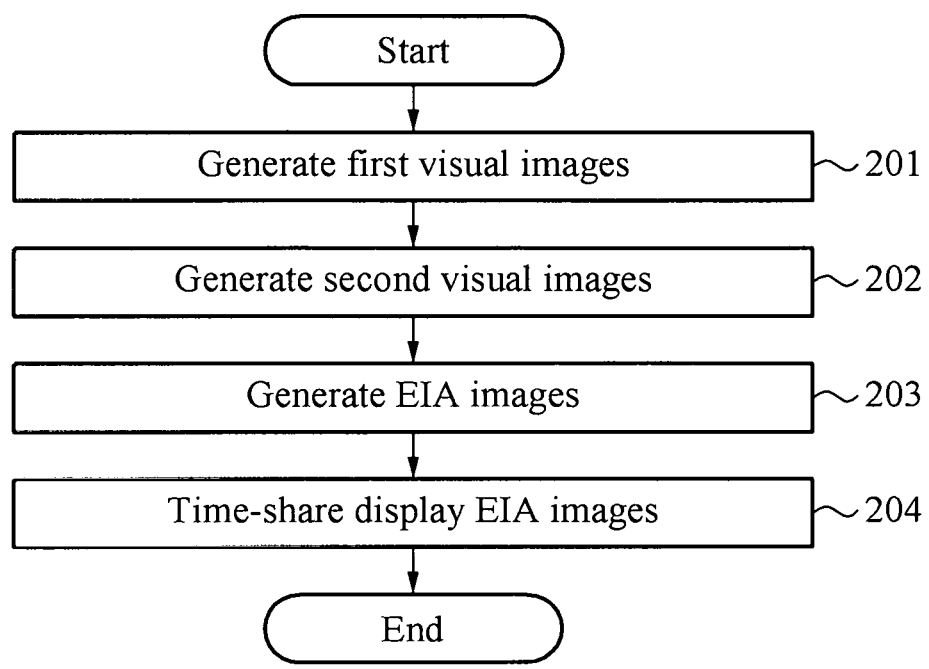
FIG. 2 is a flowchart illustrating a three-dimensional (3D) display method of a 3D display device of FIG. 1 according to example embodiments.

FIG. 2 is a flowchart illustrating a three-dimensional (3D) display method of a 3D display device of FIG. 1 according to example embodiments.

Referring to FIG. 2, in operation 201, the first visual image generator 110 generates N first visual images. For example, N may be a natural number greater than 1. For example, the N first visual images may correspond to one visual angle.

In operation 202, the second visual image generator 120 acquires N visual image groups by generating M second visual images from each of the N first visual images. For example, M may be a natural number greater than 1. M may be a natural number identical to or different from N.

In operation 203, the mapper 130 generates M EIA images based on the N visual image groups. For example, the mapper 130 may generate one EIA image by selecting N second visual images having an identical offset from the N visual image groups. The mapper 130 may generate the M EIA images by selecting the N second visual images having the identical offset from the N visual image groups.

In operation 204, the display 140 time-share displays the M EIA images. For example, the display 140 may display the M EIA images in M time slots. For example, the M time slots may be consecutive.

Each of constituent elements, for example, the first visual image generator 110, the second visual image generator 120, the mapper 130, and the display 140, of the 3D display device 100 may be provided in hardware. Each of constituent elements, for example, the first visual image generator 110, the second visual image generator 120, the mapper 130, and the display 140, may be provided using a field programmable gate array (FPGA) and/or an application specific integrated circuit (ASIC).

Example embodiments include computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A three-dimensional (3D) display method comprising:
generating N first visual images, N being a natural number greater than 1;
generating M second visual images from each of the N first visual images, M being a natural number greater than 1;
acquiring N visual image groups corresponding to the N first visual images, respectively, such that, for each one of the N visual image groups,
the visual image group includes the M second visual images generated from the first visual image, from among the N first visual images, to which the visual image group corresponds;
generating M elemental image array (EIA) images based on the N visual image groups; and
time-share displaying the M EIA images.

2. The method of claim 1, wherein the generating of the second visual images comprises generating the M second visual images generated from each of the N first visual images such that the M second visual images generated from each of the N first visual images each have a different offset in a first direction from an identical visual image among the N first visual images.

3. The method of claim 2, wherein a range of an offset among the different offsets is a range from 1/M pixels to (M−1)/M pixels.

4. The method of claim 2, wherein an offset among the different offsets is (k−1)/M pixels, k is a serial number of the second visual images, and a range of k is [1,M].

5. The method of claim 1, wherein corresponding second visual images among the M second visual images included in each of different visual image groups among the N visual image groups have an identical offset.

6. The method of claim 1, wherein the generating of the EIA images includes generating one EIA image by selecting N second visual images having an identical offset from the N visual image groups.

7. The method of claim 1, further comprising:
changing locations of the time-share displayed M EIA images by a first distance according to a first direction, and time-share displaying the M EIA images again at the changed locations.

8. The method of claim 1, wherein a resolution of the N first visual images with respect to a first direction is M times a resolution, with respect to the first direction, of the M second visual images generated from each of the N first visual images.

9. The method of claim 8, wherein the first direction is a horizontal direction or a vertical direction.

10. The method of claim 1, wherein the N first visual images correspond to one visual angle.

11. A three-dimensional (3D) display device of an integral imaging display system, the device comprising:
a memory storing computer-executable instructions; and
one or more processors configured to execute the instructions such that the one or more processors are configured to,
generate N first visual images corresponding to one visual angle, N being a natural number greater than 1,
generate M second visual images from each of the N first visual images, M being a natural number greater than 1,
acquire N visual image groups corresponding to the N first visual images, respectively, such that, for each one of the N visual image groups,
the visual image group includes the M second visual images generated from the first visual image, from among the N first visual images, to which the visual image group corresponds, and
generate M elemental image array (EIA) images based on the N visual image groups; and
a display configured to time-share display the M EIA images.

12. The device of claim 11, wherein the one or more processors are configured to execute the instructions such that the one or more processors are configured to generate the M second visual images generated from each of the N first visual images such that the M second visual images generated from each of the N first visual images each have a different offset in a first direction from an identical visual image among the N first visual images.

13. The device of claim 11, wherein corresponding second visual images among the M second visual images included in each of different visual image groups among the N visual image groups have an identical offset.

14. The device of claim 11, wherein the one or more processors are configured to execute the instructions such that the one or more processors are configured to generate one EIA image by selecting N second visual images having an identical offset from the N visual image groups.

15. The device of claim 11, wherein the display is configured to change locations of the time-share displayed M EIA images by a first distance according to a first direction, and time-share display the M EIA images again at the changed locations.

16. The device of claim 11, wherein a resolution of the N first visual images with respect to a first direction is M times a resolution, with respect to the first direction, of the M second visual images generated from each of the N first visual images.

17. The device of claim 16, wherein the first direction is a horizontal direction or a vertical direction.

18. A non-transitory computer-readable medium storing computer-executable instructions that, when executed by a processors, cause the processor to perform operations including,
generating N first visual images, N being a natural number greater than 1;
generating M second visual images from each of the N first visual images, M being a natural number greater than 1;
acquiring N visual image groups including each of the M second visual images;
generating M elemental image array (EIA) images based on the N visual image groups; and
time-share displaying the M EIA images.

* * * * *